United States Patent
Lee et al.

(10) Patent No.: US 10,797,340 B2
(45) Date of Patent: Oct. 6, 2020

(54) LITHIUM AIR BATTERY

(71) Applicants: HYUNDAI MOTOR COMPANY, Seoul (KR); KIA MOTORS CORPORATION, Seoul (KR)

(72) Inventors: Se Young Lee, Seoul (KR); In Woo Song, Yongin-si (KR); Jun Ki Rhee, Suwon-si (KR); Hee Yeon Ryu, Yongin-si (KR); Yoon Ji Lee, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 246 days.

(21) Appl. No.: 15/832,411

(22) Filed: Dec. 5, 2017

(65) Prior Publication Data

US 2019/0074536 A1 Mar. 7, 2019

(30) Foreign Application Priority Data

Sep. 4, 2017 (KR) .......................... 10-2017-0112356

(51) Int. Cl.

| | |
|---|---|
| *H01M 10/052* | (2010.01) |
| *H01M 4/86* | (2006.01) |
| *H01M 2/40* | (2006.01) |
| *H01M 2/16* | (2006.01) |
| *H01M 10/0562* | (2010.01) |
| *H01M 12/08* | (2006.01) |
| *H01M 4/62* | (2006.01) |
| *H01M 10/48* | (2006.01) |
| *H01M 4/38* | (2006.01) |

(52) U.S. Cl.
CPC ....... *H01M 10/052* (2013.01); *H01M 2/1686* (2013.01); *H01M 2/40* (2013.01); *H01M 4/62* (2013.01); *H01M 4/8605* (2013.01); *H01M 10/0562* (2013.01); *H01M 10/48* (2013.01); *H01M 12/08* (2013.01); *H01M 4/382* (2013.01)

(58) Field of Classification Search
CPC ...... H01M 2/1686; H01M 2/40; H01M 4/382; H01M 4/62; H01M 4/8605; H01M 10/052; H01M 10/0562; H01M 10/48; H01M 12/06; H01M 12/08
See application file for complete search history.

(56) References Cited

U.S. PATENT DOCUMENTS

2015/0010833 A1* 1/2015 Amendola .............. H01M 4/48
429/406

FOREIGN PATENT DOCUMENTS

| WO | WO 2013/080968 | * | 6/2013 |
| WO | WO 2013/084806 | * | 6/2013 |

OTHER PUBLICATIONS

Machine translation of the description and claims of WO 2013/080968, published on Jun. 6, 2013 (Year: 2013).*
Machine translation of the description and claims of WO 2013/084806, published on Jun. 13, 2013 (Year: 2013).*

* cited by examiner

*Primary Examiner* — Anca Eoff
(74) *Attorney, Agent, or Firm* — Morgan, Lewis & Bockius LLP

(57) ABSTRACT

A lithium air battery comprising a plurality of unit cells which have different diameters, each unit cell comprises: electrodes including: a disc-shaped positive electrode having a first air flow path passing through the positive electrode in a vertical direction of the lithium air battery and one or more electrolyte flow paths on the positive electrode in a horizontal or vertical direction of the lithium air battery; and an negative electrode having a second air flow path passing through the negative electrode in the vertical direction to coincide with the first air flow path; and a separator disposed between the positive electrode and the negative electrode. The unit cells are stacked in the vertical direction within a stack cell tank such that a diffusion layer is disposed between the respective unit cells. A lowermost unit cell has the greatest diameter and diameters of the remaining unit cells, which are sequentially stacked on a lowermost unit cell, gradually decreases vertically in an upward direction so that the unit cells have a stepped structure.

15 Claims, 4 Drawing Sheets

[FIG. 1]
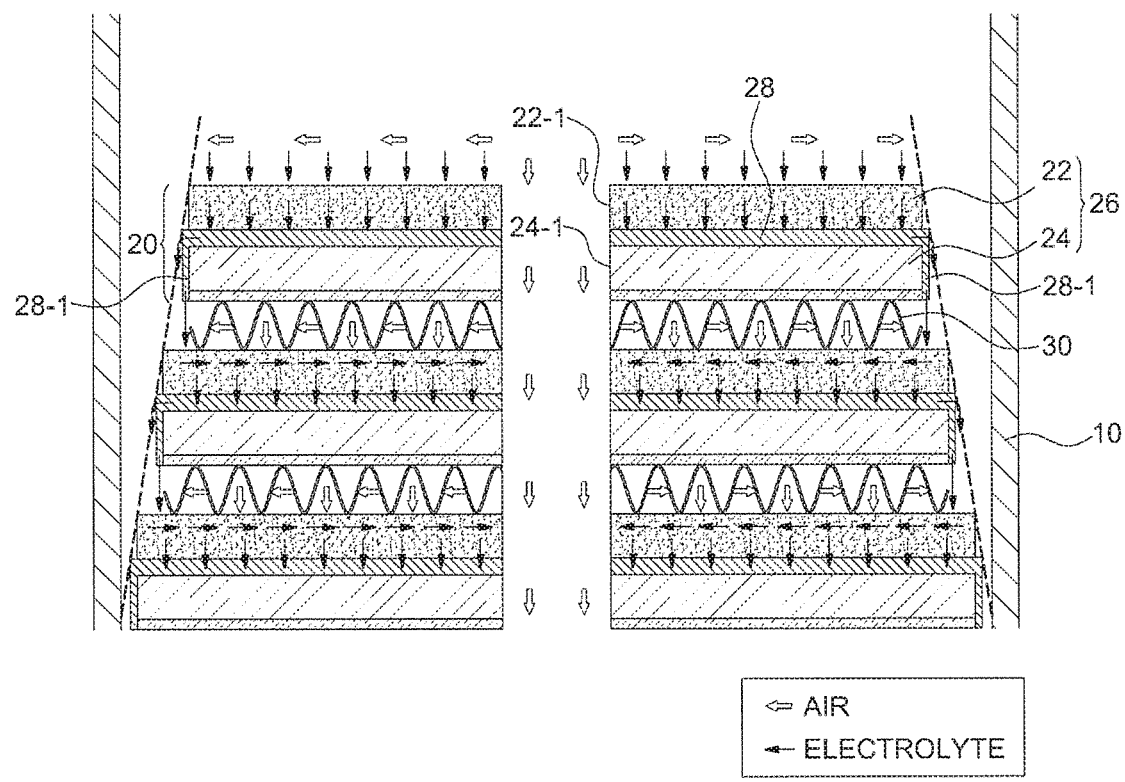
⇐ AIR
← ELECTROLYTE
[FIG. 2A]
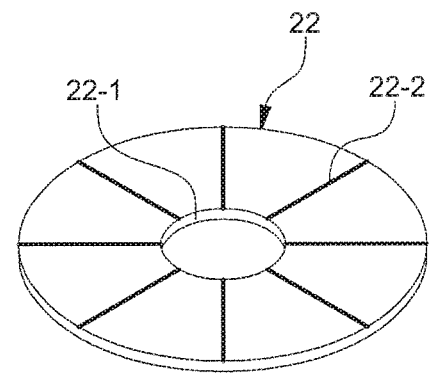

[FIG. 2B]
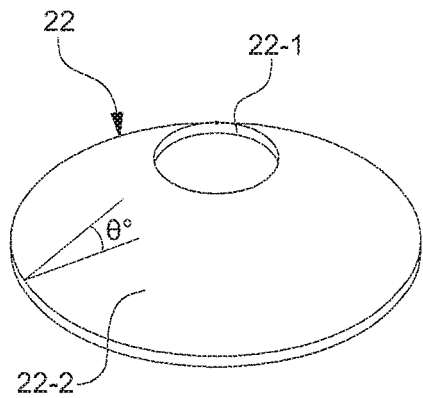
[FIG. 2C]
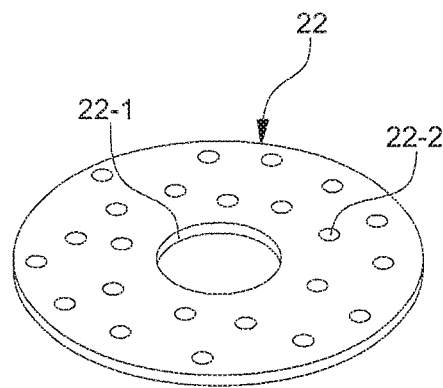
[FIG. 2D]
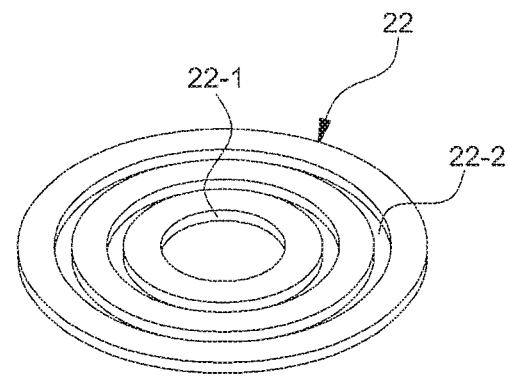

[FIG. 3]
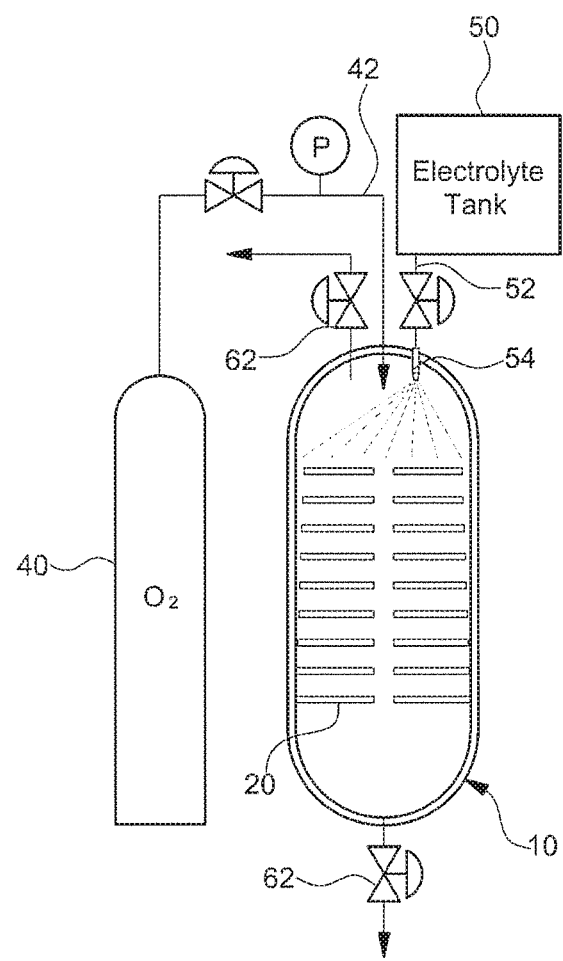

[FIG. 4]
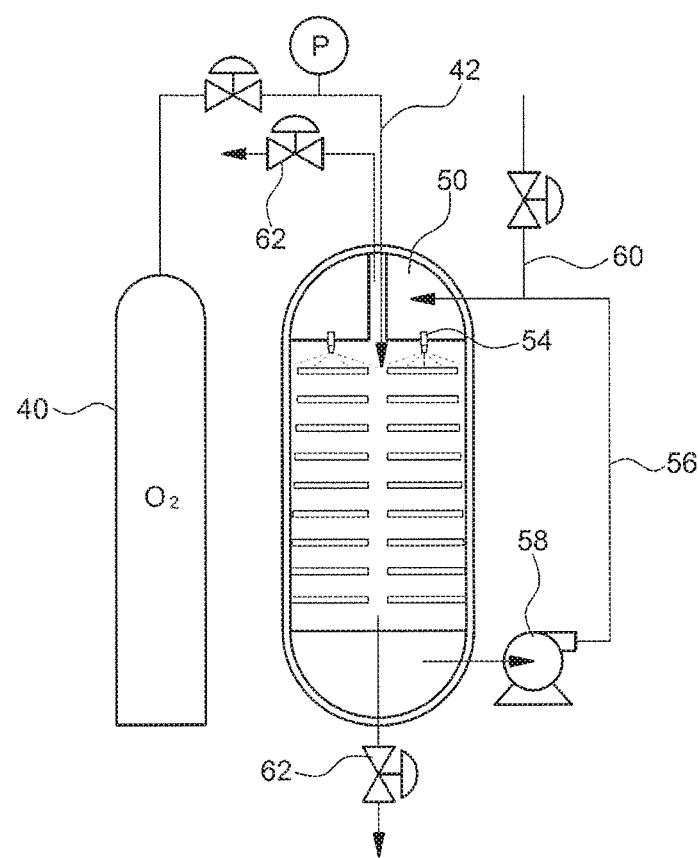

LITHIUM AIR BATTERY

CROSS-REFERENCE TO RELATED APPLICATION

This application claims under 35 U.S.C. § 119(a) priority to the benefit of Korean Patent Application No. 10-2017-0112356 filed on Sep. 4, 2017, the entire content of which is incorporated herein by reference.

TECHNICAL FIELD

The present disclosure relates to a lithium air battery. More particularly, the present disclosure relates to a lithium air battery having a novel structure in which unit cells are stacked in a stepped structure using disc-type electrodes having radial flow paths and vertical flow paths.

BACKGROUND

In general, a lithium air battery is considered as a secondary battery, charge and discharge of which are carried out by electrochemical reaction between lithium and oxygen.

The lithium air battery includes a plurality of stacked unit cells, each unit cell includes electrodes including an air electrode, i.e., a positive electrode, and an negative electrode formed of lithium, and a separator formed of a material allowing passage of a liquid electrolyte and located between the positive electrode and the negative electrode, and a diffusion layer to uniformly diffuse air and the electrolyte is disposed between the respective cells.

Therefore, when the lithium air battery is discharged, lithium ions moving from the negative electrode to the positive electrode and oxygen supplied to the positive electrode react with each other at a surface of the positive electrode and thus generate a lithium oxide on the surface of the positive electrode and, when the lithium air battery is charged, the lithium oxide is decomposed and thus produces electrical energy.

It is known that the conventional lithium air battery has problems, as below.

(1) Electrolyte Volatilization and Exhaustion

During a process of charging and discharging the lithium air battery, 3-phase reaction, in which lithium ions, electrons and oxygen meet at one position and react with one another, occurs. Here, since the lithium ions are supplied from an electrolyte, the electrons are supplied from the electrode and oxygen is supplied from the outside, the electrolyte is unavoidably exposed to oxygen.

Therefore, the electrolyte is volatile and thus volatilization of the electrolyte occurs, and the electrolyte generates gas and is exhausted due to exposure of the electrolyte to strong oxidation-reduction potential at the positive electrode and the negative electrode during charging and discharging reaction.

As such, the electrolyte is volatilized and exhausted during the charging and discharging process of the lithium air battery and, thus, use of the lithium air battery is limited.

(2) Application of Low Oxygen Partial Pressure

During the charging and discharging process of the lithium air battery, when 3-phase reaction occurs, oxygen must be supplied to the positive electrode and serve as an active material.

When a partial pressure of oxygen used as the active material is increased, a reaction resistance value generated during discharging reaction is decreased and thus reaction efficiency is increased. However, since a battery pack, in which an oxygen partial pressure may be greatly raised when a lithium air battery including a plurality of stacked unit cells is manufactured, is not developed yet, there is no choice but to apply a low oxygen partial pressure for the charging and discharging process.

(3) Difficulty in Oxygen Diffusion in Oxygen Diffusion Layer

Since oxygen is used as the active material in the lithium air battery and uniform reaction is required for a long lifespan of the cells, uniform supply of oxygen per unit area of the electrode is necessary.

Now, the lithium air battery solves a diffusion problem of oxygen used in reaction using a gas diffusion layer (GDL) as the oxygen diffusion layer or using a porous carrier as a carrier to hold a positive electrode active material. However, in a large-scale electrode, difficulty in uniform oxygen diffusion is not solved and, thus, additional oxygen flow paths are required.

SUMMARY OF THE DISCLOSURE

The present disclosure has been made in an effort to solve the above-described problems associated with the prior art and it is an object of the present disclosure to provide a lithium air battery which may minimize volatilization and exhaustion of an electrolyte during a charging and discharging process, uniformly diffuse and supply the electrolyte to an electrode, and increase a partial pressure of oxygen as an active material during the charging and discharging process so as to effectively supply oxygen to a positive electrode and accomplish uniform oxygen supply per unit area of the electrode.

In one aspect, the present disclosure provides a lithium air battery including a plurality of unit cells having different diameters, each unit cell including electrodes including a disc-shaped positive electrode having a first air flow path passing therethrough in a vertical direction of the lithium air battery and one or more electrolyte flow paths on the positive electrode in a horizontal or vertical direction of the lithium air battery, and an negative electrode having a second air flow path passing therethrough in the vertical direction to coincide with the first air flow path, and a separator disposed between the positive electrode and the negative electrode, wherein the unit cells are stacked in the vertical direction within a stack cell tank such that a diffusion layer is disposed between the respective unit cells, and the lowermost unit cell has the greatest diameter and the diameters of the unit cells sequentially stacked on the lowermost unit cell gradually decreases in the upward direction, so that the unit cells have a stepped structure.

A subsidiary separator surrounding and protecting a perimeter of the negative electrode may extend from an outer diameter part of the separator.

The positive electrode may be formed to have a disc shape provided with the first air flow path formed through the center thereof in the vertical direction and a plurality of electrolyte flow paths formed on one surface thereof as grooves extending in the horizontal direction from the first air flow path to the edge of the positive electrode and arranged radially.

The positive electrode may be formed to have an umbrella shape provided with the first air flow path formed through the center thereof in the vertical direction and an electrolyte flow path formed as a part of the positive electrode inclined downward from the first air flow path to the edge of the positive electrode at a designated angle.

The positive electrode may be formed to have a disc shape provided with the first air flow path formed through the center thereof in the vertical direction and a plurality of electrolyte flow paths formed through the positive electrode in the vertical direction throughout the entirety of the positive electrode from the first air flow path to the edge of the positive electrode.

The positive electrode may have a structure including a plurality of concentric discs having different diameters and provided with the first air flow path formed through the center of the concentric disc located at a central region of the positive electrode in the vertical direction and a plurality of electrolyte flow paths formed as separation spaces between the respective concentric discs in the vertical direction.

The negative electrode may be formed to have a disc shape provided with the second air flow path formed through the center thereof in the vertical direction.

An oxygen supply line connected to a separate oxygen supply tank and an electrolyte supply line connected to a separate electrolyte tank may be connected to an inlet of the stack cell tank, and a nozzle connected to the end of the electrolyte supply line to uniformly spray the electrolyte throughout the overall surface of an electrode may be installed at the stack cell tank.

An oxygen supply line connected to an oxygen supply tank may be connected to an inlet of the stack cell tank, an electrolyte tank may be installed within an upper region of the inner space of the stack cell tank, and nozzles to uniformly spray the electrolyte throughout the overall surface of an electrode may be installed at outlets of the electrolyte tank installed within the upper region of the inner space of the stack cell tank.

A re-circulation line to re-circulate the electrolyte may be connected between a lower region of the inner space of the stack cell tank and the electrolyte tank, and a re-circulation pump may be mounted at the re-circulation line.

An electrolyte refilling line may be connected to the re-circulation line.

Ventilation valves to urgently exhaust oxygen may be installed at upper and lower parts of the stack cell tank.

The stack cell tank may employ a bombe structure so as to satisfy high-pressure process conditions.

Other aspects and preferred embodiments of the invention are discussed infra.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a cross-sectional view exemplarily illustrating a lithium air battery, in which unit cells are stacked, in accordance with the present disclosure;

FIGS. 2A to 2D are perspective views illustrating positive electrodes of a lithium air battery in accordance with embodiments of the present disclosure;

FIG. 3 is a view illustrating a lithium air battery in accordance with one embodiment of the present disclosure; and FIG. 4 is a view illustrating a lithium air battery in accordance with another embodiment of the present disclosure.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

FIG. 1 is a cross-sectional view exemplarily illustrating a lithium air battery, in which unit cells are stacked, in accordance with the present disclosure. Here, reference numeral 10 indicates a stack cell tank.

The stack cell tank 10 is a tank in which unit cells of the lithium air battery are stacked and installed, and has a bombe structure which is cylindrical and has semi-circular upper and lower surfaces so as to satisfy high-pressure process conditions (for example, normal pressure—10 bar) for battery charging and discharging reaction.

In accordance with the present disclosure, as exemplarily shown in FIG. 1, the unit cells 20 are stacked in a stepped structure within the stack cell tank 10.

Each unit cell 20 includes electrodes 26 including an air electrode, i.e., a positive electrode 22, and an negative electrode 24 formed of lithium, and a separator 28 formed of a material transmitting a liquid electrolyte and located between the positive electrode 22 and the negative electrode 24.

Particularly, the positive electrode 22 and the negative electrode 24 of the electrodes 26 have disc shapes having different diameters.

Here, a first air flow path 22-1 in the vertical direction is formed through the positive electrode 22 of the electrodes 26 and, simultaneously, one or more electrolyte flow paths 22-2 (see FIGS. 2A-2D) in the horizontal or vertical direction are formed on the 20 positive electrode 22, and a second air flow path 24-1 in the vertical direction coinciding with the first air flow path 22-1 is formed through the negative electrode 24.

Therefore, the unit cells 20, each of which is formed by sequentially stacking the positive electrode 22, the separator 28 and the negative electrode 24, are stacked in the vertical direction in the stack cell tank 10, and a diffusion layer 30 is disposed between the respective unit cells 20.

Particularly, when the unit cells 20 are stacked, the electrodes 26 having the greatest diameter are arranged at the lowermost position and thereafter the diameters of the stacked electrodes 26 are gradually decreased in the upward direction.

Therefore, when the unit cells 20 in accordance with the present disclosure are stacked in the vertical direction in the stack cell tank 10, the unit cells 20 are stacked such that the unit cell 20 arranged at the lowermost position has the greatest diameter and thereafter the diameters of the unit cells 20 are gradually decreased in the upward direction, thus forming a stepped structure.

The positive electrode 22 of the electrodes 26 may have a disc shape through which the first air flow path 22-1 in the vertical direction is formed and on which one or more various electrolyte flow paths 22-2 (see FIGS. 2A-2D) in the horizontal or vertical direction are formed, and the negative electrode 24 may be provided to have a disc shape through which the second air flow path 24-1 in the vertical direction coinciding with the first air flow path 22-1 is formed.

With reference to FIG. 2A, a positive electrode 22 may have a disc shape having a first air flow path 22-1 in the vertical direction formed through the center thereof and a plurality of electrolyte flow paths 22-2 formed as grooves extending in the horizontal direction from the first air flow path 22-1 to the edge of the positive electrode 22 and arranged radially.

Therefore, oxygen supplied from an oxygen supply source flows in the downward direction along the first air flow path 22-1, and an electrolyte supplied from an electrolyte supply source flows in the outward direction of the positive electrode 22 along the groove-shaped electrolyte flow paths 22-2.

With reference to FIG. 2B, a positive electrode 22 may have an umbrella shape provided with a first air flow path 22-1 in the vertical direction formed through the center thereof such that the positive electrode 22 is inclined downward from the first air flow path 22-1 to the edge of the positive electrode 22 at a designated angle, and such a downward inclined part of the positive electrode 22 serves as an electrolyte flow path 22-2, along which an electrolyte may flow in the downward direction.

Therefore, oxygen supplied from an oxygen supply source flows in the downward direction along the first air flow path 22-1, and the electrolyte supplied from an electrolyte supply source flows toward a next lower unit cell along the downwardly inclined electrolyte flow path 22-2.

With reference to FIG. 2C, a positive electrode 22 may have a disc shape provided with a first air flow path 22-1 in the vertical direction formed through the center thereof and a plurality of electrolyte flow paths 22-2 formed as holes formed through the positive electrode 22 in the vertical direction and irregularly arranged throughout the entirety of the positive electrode 22 from the first air flow path 22-1 to the edge of the positive electrode 22.

Therefore, oxygen supplied from an oxygen supply source flows in the downward direction along the first air flow path 22-1, and an electrolyte supplied from an electrolyte supply source drops to a next lower unit cell along the hole-shaped electrolyte flow paths 22-2.

Here, the hole-shaped electrolyte flow paths 22-2 are irregularly arranged and, thus, the electrolyte may drop to the surface of an electrode of the next lower unit cell and uniformly soak the surface of the electrode so as to facilitate charging and discharging reaction.

With reference to FIG. 2O, a positive electrode 22 may have a structure in which a plurality of concentric discs having different diameters is arranged, a first air flow path 22-1 in the vertical direction is formed through the center of the concentric disc located at the central region of the positive electrode 22, and separation spaces between the respective concentric discs serve as electrolyte flow paths 22 in the vertical direction.

Therefore, oxygen supplied from an oxygen supply source flows in the downward direction along the first air flow path 22-1, and an electrolyte supplied from an electrolyte supply source drops to a next lower unit cell along the electrolyte flow paths 22-2.

Each of the unit cells 20 stacked in the stack cell tank 10 includes the separator 28 arranged between the positive electrode 22 and the negative electrode 24, and a subsidiary separator 28-1, which is bent vertically in the downward direction, is formed at an outer diameter part of the separator 28.

That is, the subsidiary separator 28-1 surrounding and protecting the perimeter of the negative electrode 24 extends from the outer diameter part of the separator 28.

Therefore, when an electrolyte exceeding a retainable amount is supplied to the unit cells 20, the electrolyte supplied to the unit cell 20 stays on the outer surface of the subsidiary separator 28-1 and then naturally drops down to the next lower unit cell 20 and, thus, functions of smoothly supplying and dispersing the electrolyte to the respective unit cells 20 may be improved.

Further, since the subsidiary separator 28-1 surrounds the perimeter of the negative electrode 24 formed of lithium and thus protects the negative electrode 24, the subsidiary separator 28-1 may block direct contact between oxygen and lithium and thus prevent oxidation of lithium.

With reference to FIG. 3, an oxygen supply line 42 connected to a separate oxygen supply tank 40 and an electrolyte supply line 52 connected to a separate electrolyte tank 50 are connected to an inlet formed at an upper part of the stack cell tank 10.

A nozzle 54 connected to the end of the electrolyte supply line 54 is installed at the stack cell tank 10, and the nozzle 54 serves to uniformly spray the electrolyte throughout the overall surface of an electrode (i.e., the surface of the positive electrode 22 of the uppermost unit cell 20).

Otherwise, as exemplarily shown in FIG. 4, an oxygen supply line 42 connected to an oxygen supply tank 40 may be connected to an inlet formed at an upper part of the stack cell tank 10, and an electrolyte tank 50 may be formed directly at or installed within an upper region of the inner space of the stack cell tank 10.

Nozzles 54 are installed at the positions of outlets of the electrolyte tank 50 installed within the upper region of the inner space of the stack cell tank 10, and the nozzles 54 also serve to uniformly spray the electrolyte throughout the overall surface of an electrode (i.e., the surface of the positive electrode 22 of the uppermost unit cell 20).

Further, if the electrolyte tank 50 is formed directly at or installed within the upper region of the inner space of the stack cell tank 10, a re-circulation line 56 to re-circulate the electrolyte is connected between a lower region of the inner space of the stack cell tank 10 and the electrolyte tank 50, and a re-circulation pump 58 driven to re-circulate the electrolyte is mounted at the re-circulation line 56.

Here, if the electrolyte tank 50 is formed directly at or installed within the upper region of the inner space of the stack cell tank 10, the electrolyte tank 50 is in a closed state and it is difficult to replenish the electrolyte in the electrolyte tank 50. Therefore, a separate electrolyte refilling line 60 is connected to the re-circulation line 56.

Therefore, when the electrolyte is replenished through the electrolyte refilling line 60, the electrolyte may easily refill the electrolyte tank 50 formed directly at or installed within the upper region of the inner space of the stack cell tank 10 and, thus, electrolyte exhaustion may be prevented.

Ventilation valves 62 to urgently exhaust gas or oxygen are installed at the upper and lower parts of the stack cell tank 10.

Therefore, when the lithium air battery cells 20 stacked in the stack cell tank 10 undergo charging or discharging reaction, if it is necessary to exhaust gas generated by the reaction or if it is necessary to urgently exhaust oxygen to the outside during malfunction of the battery cells 20, the ventilation valves 62 may be opened and thus easily exhaust gas or oxygen to the outside of the stack cell tank 10.

Here, a charging and discharging flow of the above-described lithium air battery will be described below.

First, oxygen from the oxygen supply tank 40 is supplied to the inlet of the stack cell tank 10 along the oxygen supply line 42 and, simultaneously, an electrolyte from the electrolyte tank 50 is supplied to the inside of the stack cell tank 10.

Oxygen supplied to the inside of the stack cell tank 10 moves along the first and second air flow paths 22-1 and 24-1 in the vertical direction formed at the respective unit cells 20 and permeates the diffusion layers 30, and also permeates the positive electrode 22 of the uppermost unit cell 20.

Simultaneously, the electrolyte is uniformly sprayed throughout the overall surface of an electrode (the surface of the positive electrode 22 of the uppermost unit cell 20) through the nozzle 54.

Thereafter, as described above with reference to FIGS. 2A to 2D, the electrolyte flows along the electrolyte flow paths 22-2 of the respective positive electrodes 22 and sequentially drops from the uppermost unit cell 20 to the next lower unit cell 20 in the downward direction.

Here, the electrolyte stays on the outer surface of the subsidiary separator 28-1 formed at the outer diameter part of the separator 28 and then naturally drops down to the next lower unit cell 20 and, thus, functions of smoothly supplying and dispersing the electrolyte to the respective unit cells 20 may be improved.

As described above, an electrolyte and oxygen are easily supplied to the respective unit cells 20 stacked in a stepped structure and, thus, when the lithium air battery is discharged, lithium ions moving from the negative electrode 24 to the positive electrode 22 and oxygen supplied to the positive electrode 22 react with each other at the surface of the positive electrode 22 and thus produce a lithium oxide on the surface of the positive electrode 22, and, when the lithium air battery is charged, the lithium oxide is decomposed and thus generates electrical energy.

The remaining electrolyte collected at the bottom of the stack cell tank 10 is gathered in the electrolyte tank 50 along the re-circulation line 56 by driving the re-circulation pump 58, so as to be reusable.

Further, if it is necessary to replenish the electrolyte in the electrolyte tank 50, the electrolyte is replenished through the electrolyte refilling line 60 connected to the re-circulation line 56 and, thus, the electrolyte in the electrolyte tank 50 may be replenished.

As is apparent from the above description, a lithium air battery in accordance with the present disclosure has effects, as below.

(1) Volatilization and exhaustion of an electrolyte during a process of charging and discharging the lithium air battery may be minimized, and the electrolyte may be uniformly supplied to electrodes.

(2) A partial pressure of oxygen used as an active material is increased so as to be effectively supplied to a positive electrode during the process of charging and discharging the lithium air battery and uniform supply of oxygen per unit area of the positive electrode may be achieved.

(3) By surrounding the end of an electrode, i.e., the perimeter of an negative electrode formed of lithium, by a subsidiary separator extending from a separator, the electrolyte may stay on the surface of the subsidiary separator and then naturally drop to the next lower unit cell and, thus, dispersed supply of the electrolyte throughout the overall unit cells may be further facilitated.

(4) The subsidiary separator prevents the lithium negative electrode from directly contacting oxygen and may thus prevent oxidation of the lithium negative electrode.

(5) A nozzle to uniformly spray the electrolyte is installed at the upper part of a stack cell tank, thus being capable of uniformly supplying the electrolyte to the positive electrode of the uppermost unit cell.

(6) After reaction, the electrolyte may be re-circulated to the electrolyte tank so as to be reusable.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A lithium air battery comprising a plurality of unit cells which have different diameters, each unit cell comprises:
   electrodes including: a disc-shaped positive electrode having a first air flow path passing through the positive electrode in a vertical direction of the lithium air battery and one or more electrolyte flow paths on the positive electrode in a horizontal or vertical direction of the lithium air battery; and an negative electrode having a second air flow path passing through the negative electrode in the vertical direction to coincide with the first air flow path; and
   a separator disposed between the positive electrode and the negative electrode,
   wherein the unit cells are stacked in the vertical direction within a stack cell tank such that a diffusion layer is disposed between the respective unit cells, and
   a lowermost unit cell has the greatest diameter and diameters of the remaining unit cells, which are sequentially stacked on the lowermost unit cell, gradually decreases vertically in an upward direction so that the unit cells have a stepped structure.

2. The lithium air battery of claim 1, wherein a subsidiary separator surrounding and protecting a perimeter of the negative electrode extends from an outer diameter part of the separator.

3. The lithium air battery of claim 1, wherein the first air flow path passes through a center of the positive electrode in the vertical direction and has a plurality of electrolyte flow paths on one surface of the positive electrode as grooves extending in the horizontal direction from the first air flow path to an edge of the positive electrode and arranged radially.

4. The lithium air battery of claim 1, wherein the positive electrode has an umbrella shape having the first air flow path passing through a center of the positive electrode in the vertical direction and an electrolyte flow path as a part of the positive electrode inclined downward from the first air flow path to an edge of the positive electrode at a reference angle.

5. The lithium air battery of claim 1, wherein the first air flow path passes through a center of the positive electrode in the vertical direction, and
   a plurality of electrolyte flow paths pass through the positive electrode in the vertical direction throughout the entire positive electrode from the first air flow path to an edge of the positive electrode.

6. The lithium air battery of claim 1, wherein the positive electrode has a plurality of concentric discs having different diameters and having the first air flow path in the vertical direction formed through a center of a concentric disc located at a central region of the positive electrode and a plurality of electrolyte flow paths as separation spaces between the respective concentric discs in the vertical direction.

7. The lithium air battery of claim 1, wherein the second air flow path passes through a center of the negative electrode in the vertical direction.

8. The lithium air battery of claim 1, wherein an oxygen supply line connected to a separate oxygen supply tank and an electrolyte supply line connected to a separate electrolyte tank are connected to an inlet of the stack cell tank.

9. The lithium air battery of claim 8, wherein a nozzle connected to an end of the electrolyte supply line to uniformly spray the electrolyte throughout the overall surface of an electrode is installed at the stack cell tank.

10. The lithium air battery of claim 1, wherein an oxygen supply line connected to an oxygen supply tank is connected to an inlet of the stack cell tank, and an electrolyte tank is installed within an upper region of an inner space of the stack cell tank.

11. The lithium air battery of claim 10, wherein nozzles to uniformly spray the electrolyte throughout the overall surface of an electrode are installed at outlets of the electrolyte tank which is disposed within the upper region of the inner space of the stack cell tank.

12. The lithium air battery of claim 1, wherein a re-circulation line to re-circulate the electrolyte is connected between a lower region of an inner space of the stack cell tank and an electrolyte tank, and a re-circulation pump is mounted at the re-circulation line.

13. The lithium air battery of claim 12, wherein an electrolyte refilling line is connected to the re-circulation line.

14. The lithium air battery of claim 1, wherein ventilation valves to exhaust oxygen are installed at upper and lower parts of the stack cell tank.

15. The lithium air battery of claim 1, wherein the stack cell tank has a bombe shape.

\* \* \* \* \*